E. R. TAYLOR.
RACK FOR AUTOMOBILE STEPS.
APPLICATION FILED NOV. 28, 1916.

1,273,787.

Patented July 23, 1918.

INVENTOR.
E. R. TAYLOR
BY
Carlos P. Griffin
ATTORNEY.

UNITED STATES PATENT OFFICE.

ELMORE RICE TAYLOR, OF DUCOR, CALIFORNIA.

RACK FOR AUTOMOBILE-STEPS.

1,273,787.  Specification of Letters Patent.  Patented July 23, 1918.

Application filed November 28, 1916. Serial No. 133,893.

*To all whom it may concern:*

Be it known that I, ELMORE RICE TAYLOR, a citizen of the United States, residing at Ducor, in the county of Tulare, State of California, have invented a new and useful Rack for Automobile-Steps, of which the following is a specification in such full and clear terms as will enable those skilled in the art to construct and use the same.

This invention relates to a rack for use on the step of an automobile to retain parcels thereon and its object is to produce a rack which is capable of being turned down and concealed under the step when not in use.

An embodiment of the invention is shown in the drawing in which the same reference numeral is applied to the same portion throughout, but I am aware that there may be many modifications thereof.

Figure 2:
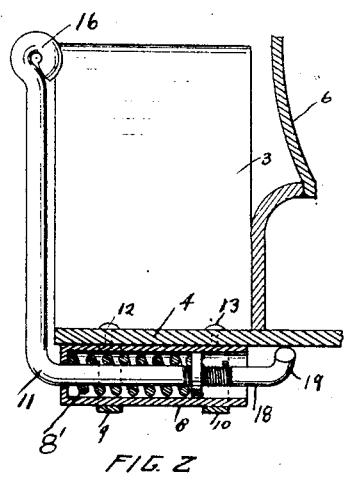
Fig. 2 is a vertical sectional view through the running board of the automobile and through a portion of the rack support showing the manner of using it.
Figure 3:
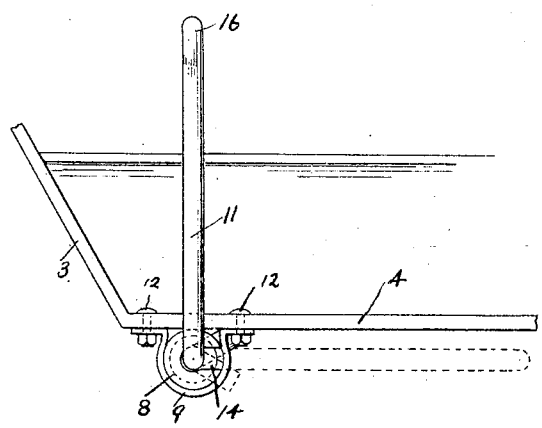
Fig. 3 is a front elevation of the rack support as it appears in use, the dotted lines indicating the position of the rack support when not in use.
Figure 4:
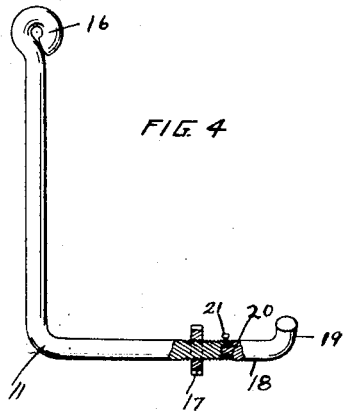
Fig. 4 is a view of the rack arm and heel piece unmounted.
Figure 5:
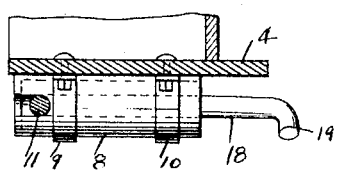
Fig. 5 is a side elevation of the tube on which the rack arm slides showing the position the rack arm occupies when not in use.
Figure 6:
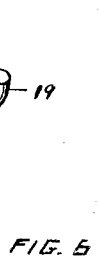
Fig. 6 is a view of a portion of rack arm having a plurality of openings therethrough to admit the use of several side rods.

The numeral 1 indicates the rear wheel of the automobile, 2 the front wheel, 3 the front mud guard, 4 the running board or step, 5 the rear mud guard; the numeral 6 indicates the body of the automobile. This rack is secured to the step 4 and is connected therewith by means of the tubes 8, each of said tubes being secured to the step by means of the straps 9 and 10 and bolts 12 and 13, there being two bolts for each strap. Slidable within the tube is an L shaped rod 11, said rod having a washer 17 thereon against which the spiral spring 8' bears, the object being to hold the rack tightly in toward the machine. The washer 17 is threaded on the rod 11 and the spiral spring bears upon it. Secured in the end of the rod 11 is a short rod 18, said rod 18 having a lug 19 turned at an angle thereto such as to prevent the longest portion of the arm 11 from turning out of the vertical in one direction, the lug 19 contacting with the under side of the step when in use, as illustrated in Figs. 2 and 3. When the rack is not in use the rods 11 may be turned down to occupy the position shown in Fig. 5 whereupon the rod will pass into the notch 14 in the end of the sleeve 8, and it will be rigidly held in that position by the pressure from the spring 8'. The rod 18 has a projecting tip 20 which projects into the hole in the end of the rod 11, and is held therein by means of suitable set screw 21.

Figure 1:
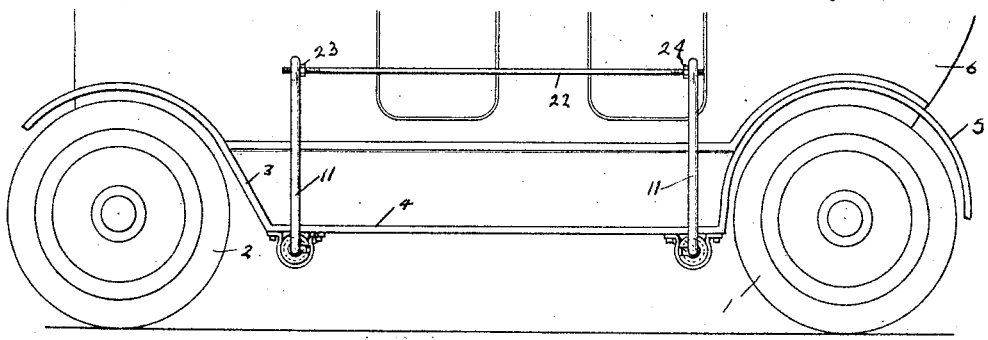
Figure 1 is a side elevation of a portion of an automobile showing this rack applied to the running board thereof.

It will be observed that in Fig. 1 the two rods 11 turn down in opposite directions and may therefore be held in a fixed vertical position by means of the bar 22 passing through eyes 16 upon which are threaded the nuts 23, 24, but if it is desired to use more of the bars another may be added at will or they may be used without the bar 22 as may be desired. If a number of bars such as 22 are desired to be used the long arm of the rod may be provided as shown at 25 with a series of holes, 26 through which four bars 22 may be passed. It is also to be understood that the opening in the rod 11 may be of any desired size to take a strap or rod as may be wished.

Having thus described my invention what I claim as new and desire to secure by Letters Patent of the United States, is as follows:—

1. A rack for the running board of an automobile comprising the combination therewith of a movable L-shaped rod, a support in which the rod may be turned and in which it is slidable, and a lug carried by the rod to prevent the rod from being turned out of the vertical in one direction, the support having means to hold the rod parallel to the step below the same when not in use.

2. A rack for the running board of an automobile comprising the combination with the step of an automobile of an L shaped arm, a tubular support in which said arm slides and which is secured to the step of the automobile, a spring bearing upon a portion of said arm and an extension arm having a lug adapted to bear upon the under side of the step to prevent the arm from being turned out of a given position in one direction.

3. The combination with a tubular member of an arm slidably and partially revolubly supported therein, a spring within the tubular member to retract the arm, a lug on one end of the arm extending through the tubular member, said lug extending at an angle to said arm to prevent it from being completely rotated, and an arm connected with the slidable arm, the latter adapted to stand in a vertical position when the lug contacts with a horizontally extending obstruction.

4. The combination with a tubular member having means to secure it to a fixed support, of an L-shaped arm slidably and partially revolubly supported thereby, a spring adapted to retract the arm into a notch in the tubular member, and a lug on the arm to prevent it from being turned beyond a fixed position in one direction.

In testimony whereof I have hereunto set my hand this 14 day of October A. D. 1916, in the presence of the two subscribed witnesses.

ELMORE RICE TAYLOR.

Witnesses:
LESTER H. KEITH,
H. L. MARTIN